United States Patent [19]

Enami et al.

[11] Patent Number: 4,677,359
[45] Date of Patent: Jun. 30, 1987

[54] STEPPING MOTOR DRIVE METHOD AND SYSTEM CAPABLE OF STOPPING THE ROTOR IN A REQUIRED ANGULAR POSITION

[75] Inventors: Katsuya Enami, Tachikawa; Hiroshi Tsuyuguchi; Takahiro Sakaguchi, both of Tokyo, all of Japan

[73] Assignee: Teac Corporation, Tokyo, Japan

[21] Appl. No.: 829,428

[22] Filed: Feb. 13, 1986

[30] Foreign Application Priority Data

Feb. 15, 1985 [JP] Japan .................................. 60-27917

[51] Int. Cl.$^4$ ............................................. H02P 8/00
[52] U.S. Cl. .................................. 318/69 G; 318/685
[58] Field of Search ............................. 318/685, 69 G

[56] References Cited

U.S. PATENT DOCUMENTS

| | | | |
|---|---|---|---|
| 3,678,481 | 7/1972 | Dalziel et al. | 360/99 |
| 3,748,566 | 7/1973 | Brembs | 318/685 |
| 4,496,892 | 1/1985 | Bugatto, Jr. | 318/685 |

*Primary Examiner*—William M. Shoop, Jr.
*Assistant Examiner*—Saul M. Bergmann
*Attorney, Agent, or Firm*—Woodcock Washburn Kurtz Mackiewicz & Norris

[57] ABSTRACT

A drive method and system are disclosed for a stepping motor typically having several sets of four phase windings on respective stator poles of annular arrangement, and a rotor having several alternating N and S poles at constant circumferential spacings. Normally, the windings are sequentially excited as by a single or two phase drive mode to cause the rotor to rotate by increments. For stopping the rotor in a required angular position, any one or two of the four phase windings are excited in a normal direction to polarize the associated stator pole or poles into one polarity to attract one of the opposite poles of the rotor. Further, the other phase windings on both sides of the noted one or two windings are excited in the reverse direction, as by the discharge of capacitors, with the consequent polarization of the associated stator poles into the opposite polarity. The stator poles thus polarized into the different polarities make possible the positive detenting of the rotor in the required angular position.

11 Claims, 8 Drawing Figures

STEPPING MOTOR DRIVE METHOD AND SYSTEM CAPABLE OF STOPPING THE ROTOR IN A REQUIRED ANGULAR POSITION

BACKGROUND OF THE INVENTION

Our invention relates to a method of, and a system for, driving an electric stepping motor such as that employed, for example, in a disk drive for feeding a magnetic transducer head assembly, or a pair of such assemblies, radially of a flexible magnetic disk so as to enable the head assembly or assemblies to access the individual tracks on one or both sides of the disk. The stepping motor drive method and system of our invention are particularly notable for the capability of stopping the rotor in any required angular position with little or no displacement, in order that, in one typical application of our invention, the head assembly or assemblies be positioned exactly on any desired tracks on the magnetic disk.

Bidirectional stepping motors have found widespread use in the radial feed mechanism for the head assembly or assemblies of a disk drive, as disclosed for example in Dalziel et al. U.S. Pat. No. 3,678,481. The stepping motor in general has one or more sets of several phase windings arranged sequentially on stator poles of annular arrangement around a rotor which may be of permanent magnet material. The sequential excitation of the stator windings results in the rotation of the rotor in discrete increments or steps. In addition to its simplicity of construction and ease of control, the stepping motor makes it possible to rather accurately position the transducer head assembly or assemblies on desired tracks on the magnetic disk.

We said "rather accurately" because, upon cessation of the sequential excitation of the stator windings for setting the stepping motor out of rotation, the rotor may not come into exact alignment with the required stator poles if the load on the motor is comparatively heavy. The reason for this is the insufficiency of the attractive forces exerted electromagnetically by the required stator poles upon the rotor poles of opposite polarity. In such cases, even if the same stator windings are finally energized for setting the rotor out of rotation in a position of alignment with the associated stator poles, the rotor will come to a stop in different angular positions slightly out of alignment with the required stator poles depending upon the direction in which it has been in rotation. Such differences between the stopped positions of the rotor, known to the specialists as hysteresis errors, present a serious problem, for example, in the radial positioning of the transducer head assembly or assemblies on the magnetic disk in a disk drive, possibly making difficult the transfer of data therebetween.

In solving the above problem we should give heed to the fact that the attractive force exerted by each stator pole on the rotor is weaker when the rotor pole of opposite polarity is in exact alignment therewith than when it is slightly out of alignment in either direction. There has, in short, been an "insensitive zone" associated with each stator pole, where the stator is more or less incapable of magnetically controlling the rotor.

SUMMARY OF THE INVENTION

We have hereby discovered how to drive a stepping motor so as to cause its rotor to come to a stop in any required angular position with respect to the stator with little or no displacement in the face of the "insensitive zone" which has heretofore been present with each stator pole.

According to our invention, stated in brief, there is provided a method of driving a stepping motor which comprises sequentially exciting the motor windings in any of several possible conventional drive modes to cause the incremental rotation of the rotor toward any required angular position. For holding the rotor in the required angular position, at least one of the different phase windings, dictated by the drive mode in use, is excited for the polarization of the associated stator pole into one polarity. Further, at least in partial concurrence with the above excitation of at least one winding, those of the different phase windings which are disposed on both sides of that one winding are also excited in a direction opposite to that in which the one winding is excited, with the consequent polarization of the associated stator windings into the opposite polarity.

Thus, if one of the stator poles is polarized into S polarity, for instance, to attract an N pole of the rotor at the end of the sequential excitation of the windings in the single phase drive mode, the stator poles on its opposite sides are polarized into N polarity. These stator poles of N polarity repel the N rotor pole being attracted by the S stator pole, thereby forcing the N rotor pole toward a position of exact alignment with the S stator pole. Consequently, the rotor can be positioned in more precise alignment with the S stator pole than if the stator poles on its opposite sides were left unpolarized as has been the case heretofore.

Our invention also provides a stepping motor drive system for carrying the above summarized method into practice. The drive system features the use of capacitors for the reverse excitation of the motor windings on both sides of the winding or windings being excited in the forward direction. Such capacitors can be readily incorporated in conventional stepping motor drive systems without any major alteration of the existing parts and without any modification of the known drive modes.

The above and other features and advantages of our invention and the manner of realizing them will become more apparent, and the invention itself will best be understood, from a study of the following description and appended claims, with reference had to the attached drawings showing the preferred embodiments of our invention.

DESCRIPTION OF THE PREFERRED EMBODIMENTS

Figure 1:
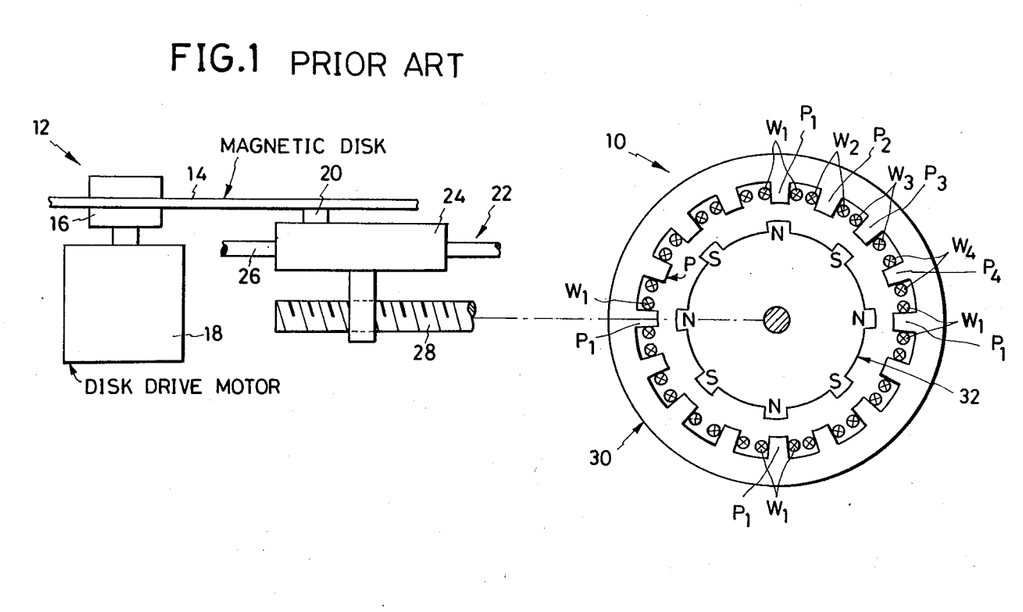
FIG. 1 is a diagrammatic section through an example of stepping motor of known configuration to be driven in accordance with the novel concepts of our invention, the stepping motor being herein shown adapted for transporting a magnetic transducer head assembly in a radial direction of a flexible magnetic disk in a disk drive and being shown together with the associated parts of the disk drive.

We will now describe our invention in detail in the disk drive environment as illustrated in FIG. 1. Generally designated 10, the exemplified stepping motor to be driven by the novel concepts of our invention is herein shown incorporated in a disk drive 12 for use with a flexible magnetic disk 14. The magnetic disk 14 is replaceably mounted on a turntable 16 driven directly by an electric disk drive motor 18. The particular magnetic disk 14 shown here is of the single sided type; that is, only one side of the disk lends itself to data transfer with a magnetic transducer head assembly 20. This head assembly is movable radially of the magnetic disk 14 for accessing a series of concentric tracks, not shown, on the disk.

Employed for such radial travel of the head assembly 20 with respect to the magnetic disk 14 is a head transport mechanism 22 of which the stepping motor 10 forms a part. The head transport mechanism 22 includes a carriage 24 which has the head assembly 20 mounted thereon and which reciprocably travels along a pair of guide rods 26, one seen, extending radially of the magnetic disk 14 on the turntable 16. The carriage 24 is operatively coupled to a lead screw 28, which in turn is coupled directly to the stepping motor 10 to be bidirectionally driven thereby in discrete increments which are predetermined in accordance with the pitch distances between the tracks on the magnetic disk 14.

We have shown the stepping motor 10 as being of the four phase, permanent magnet type, comprising a stator 30 of magnetic material and a permanent magnet rotor 32, with the latter being rotatably and concentrically mounted within the former. The stator 30 has a series of salient poles, generally denoted by the capital P, which are arranged annularly at constant angular spacings about the axis of rotation of the rotor 32. Since this motor 10 is of the four phase design, each set of four neighboring stator poles, indicated respectively P1, P2, P3 and P4, have first phase W1, second phase W2, third phase W3 and fourth phase W4 windings coiled respectively thereon. The motor 10 is shown to have four such sets of first, second, third and fourth phase windings W1 through W4 arranged sequentially and repetitively in the order named, so that the motor has a total of sixteen windings. The corresponding phase windings of the four sets are electrically interconnected.

The permanent magnet rotor 32 is shown to have eight magnetic poles 34 disposed at constant circumferential spacings thereon. The north seeking (N) and south seeking (S) poles of the rotor 32 alternate, and the angular distance between every two neighboring ones of these rotor poles is twice that between every two neighboring ones of the stator poles P. Therefore, when the N rotor poles lie opposite the first phase stator poles P1 as shown, for example, the S rotor poles lie opposite the third phase stator poles P3.

The construction of the stepping motor 10, as well as of the disk drive 12, as so far described with reference to FIG. 1 is conventional, and therein lies no feature of our invention. The noval features of our invention will appear in the course of the following discussion of the subsequent drawings.

Figure 2:
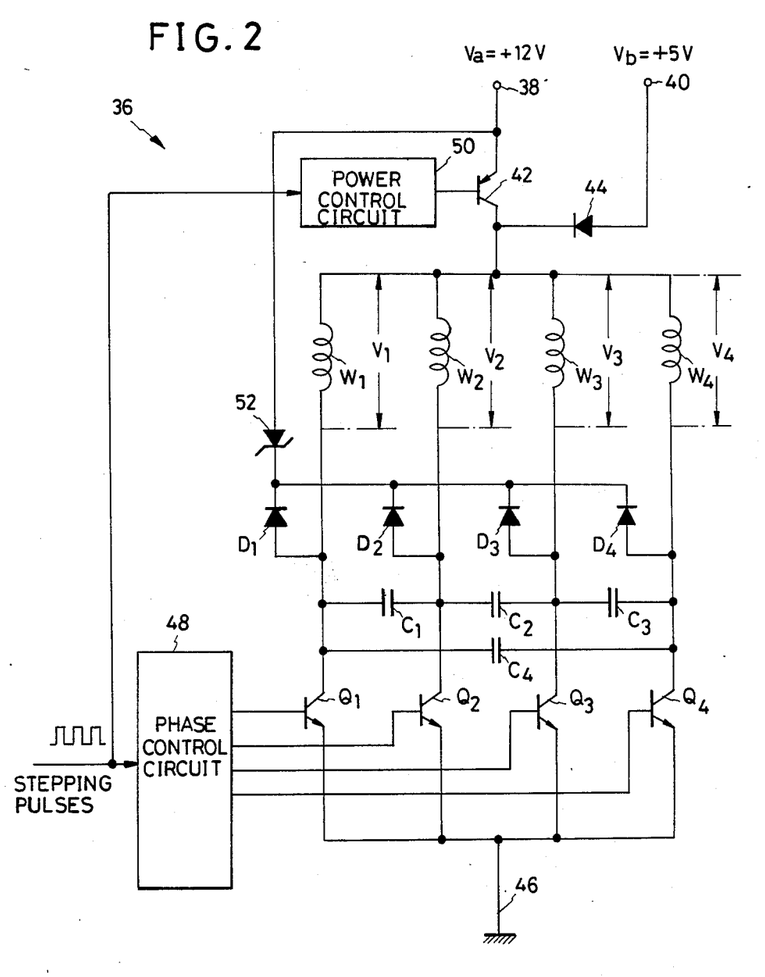
FIG. 2 is a schematic electrical diagram of the system for driving the stepping motor of FIG. 1 in accordance with our invention.

We have illustrated in FIG. 2 the drive system 36 for the stepping motor 10 of FIG. 1, together with the four phase stator windings W1 through W4 of the motor. The one set of stator windings W1 through W4 illustrated herein is representative of the four such sets of windings in the exemplified stepping motor 10, it being understood that the corresponding phase windings of all the sets are electrically interconnected.

The motor drive system 36 has two direct current supply terminals 38 and 40, the first supply terminal 38 providing a supply voltage Va of, say, 12 volts, and the second supply terminal 40 providing a lower supply voltage Vb of, say, five volts. The first supply terminal 38 is connected to first extremities of the four phase stator windings W1 through W4 via a power switching transistor 42 of the PNP type, whereas the second supply terminal 40 is connected to the first extremities of the four phase stator windings via a diode 44. The power switching transistor 42 is normally conductive to allow the stator windings W1 through W4 to be energized from the first supply terminal 38 during the normal rotation of the stepping motor 10. The second supply terminal 40 is to be electrically connected to the stator windings W1 through W4 only when the rotor 32 of the stepping motor 10 is to be detented in a required angular position in accordance with our invention.

The second extremities of the stator windings W1 through W4 are connected to first to fourth switching transistors Q1, Q2, Q3 and Q4 of the NPN type, respectively, and thence are grounded by way of a common line 46. All the switching transistors Q1 through Q4 have their bases connected to a motor phase control circuit 48. This phase control circuit responds to stepping pulses, as well as to a stepping direction signal, for causing the excitation of the windings W1 through W4 via the switching transistors Q1 through Q4 in a known manner, as will be later explained in more detail. We have not shown the sources of such stepping pulses and stepping direction signal because of their conventional and well known nature.

The stepping pulses are also delivered to a power control circuit 50 connected to the base of the power switching transistor 42. Typically comprising a retriggerable monostable multivibrator, the power control circuit 50 causes nonconduction through the power switching transistor 42 upon lapse of a preset period of time following the termination of each series of stepping pulses supplied thereto, and to the phase control circuit 48, with a preassigned recurrence rate. This intended function of the power control circuit 50 will be readily attained by employing the retriggerable monostable multivibrator which remains in an unstable state for a length of time slightly longer than the time distance between the stepping pulses.

One of the most pronounced features of the motor drive system 36 resides in four capacitors C1 through C4 for the reverse excitation of the four phase windings W1 through W4 in accordance with the novel concepts of our invention. The first capacitor C1 is connected between the second extremities of the first W1 and second W2 phase windings, the second capacitor C2 between the second extremities of the second W2 and third W3 phase windings, the third capacitor C3 between the second extremities of the third W3 and fourth W4 phase windings, and the fourth capacitor C4 between the second extremities of the fourth C4 and first C1 phase windings.

Additional components of the drive system 36 are diodes D1 through D4 and a zener diode 52, all employed for the liberation of the energies stored on the windings W1 through W4 as has been known heretofore.

Figure 3:
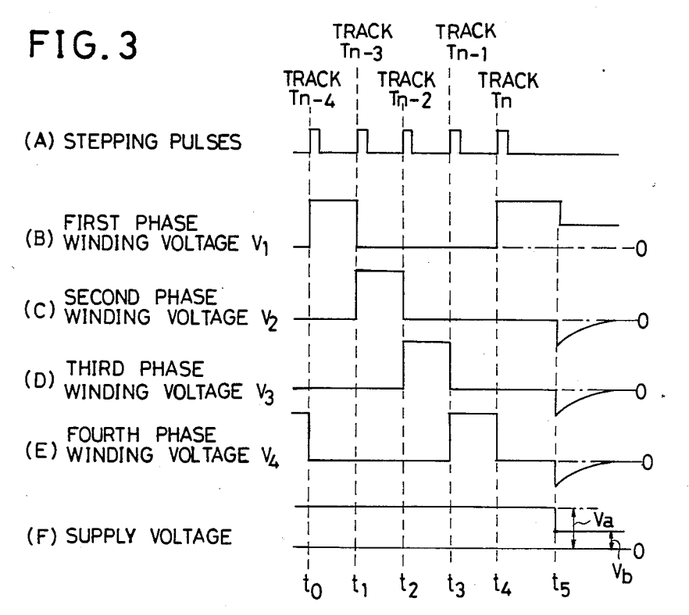
FIG. 3 is a series of waveform diagrams useful in explaining the operation of the drive system of FIG. 2, the waveforms being plotted on the assumption that the stepping motor is driven in the single phase mode.

The operation of the motor drive system 36 will become apparent from a study of the waveforms given at (A) through (E) in FIG. 3. These waveforms represent the single phase driving of the stepping motor 10; we will later discuss the two phase driving of the motor by the same drive system 36. The single phase driving of the stepping motor 10 is possible as the phase control circuit 48 turns the switching transistors Q1 through Q4 on and off one after the other in response to the stepping pulses given at (A) in FIG. 3, in the same way as heretofore to cause the sequential excitation of the stator windings W1 through W4 from the first supply terminal 38, it being understood that the power switching transistor 42 is conductive during the delivery of the stepping pulses from the unshown source. We have plotted the excitation voltages V1 through V4 across the respective stator windings W1 through W4 at (B) through (E) in FIG. 3 on the assumption that the transducer head assembly 20, FIG. 1, is stepped to an arbitrary n'th track Tn on the magnetic disk 14 by the clockwise rotation, as viewed in the same figure, of the rotor 32 of the stepping motor 10.

In response to the stepping pulses at (A) in FIG. 3 the phase control circuit 48 causes conduction through the first transistor Q1 from moment t0 to moment t1, as at (B) in FIG. 3, through the second transistor Q2 from moment t1 to moment t2, as at (C) in FIG. 3, through the third transistor Q3 from moment t2 to moment t3, as at (D) in FIG. 3, and through the fourth transistor Q4 from moment t3 to moment t4, as at (E) in FIG. 3. During these conducting periods of the switching transistors Q1 through Q4, the voltages across the associated stator windings W1 through W4 of the stepping motor 10 rise to the first supply voltage Va, as indicated at (F) in FIG. 3, with the consequent flow of excitation current of corresponding magnitude through the stator windings. Thus the transducer head assembly 20 travels one track with each stepping pulse to the required track Tn through the successive tracks Tn-4, Tn-3, Tn-2 and Tn-1.

In order to hold the transducer head assembly 20 on the track Tn, the first transistor Q1 is held conductive after the moment T4 to continue the first phase winding W1 excited with the first supply voltage Va as at (B) in FIG. 3. Then, upon lapse of a predetermined length of time after the last of the series of stepping pulses, the power control circuit 50 will cause nonconduction through the power switching transistor 42 at a moment t5, thereby causing the second supply terminal 40 to be electrically connected to the four phase windings W1 through W4 via the diode 44, as at (F) in FIG. 3.

We have stated that the first switching transistor Q1 has been conductive since the moment t4. Accordingly, from this moment t4 to the subsequent moment t5 when the supply voltage is switched from Va (12 volts) to Vb (five volts), the first C1 and fourth C4 capacitors have been charged to approximately 12 volts via the circuit comprising the second phase winding W2, first capacitor C1, first switching transistor Q1 and ground, and the circuit comprising the fourth W4 phase windings W4, fourth capacitor C4, first switching transistor Q1 and ground, respectively. The second supply voltage Vb of five volts is impressed as aforesaid to the first (upper) extremities of the four phase windings W1 through W4 at the moment t5. A potential difference of seven volts (12−5 volts) is thus created across each of the second W2 and fourth W4 phase windings, as indicated at (C) and (E) in FIG. 3. This potential difference causes the capacitors C1 and C4 to discharge until their remaining charges become equal to the second supply voltage Vb of five volts.

Thus the second W2 and fourth W4 phase windings are both energized in the reverse (upward as seen in FIG. 2) direction after the moment t5, as at (C) and (E) in FIG. 3. Further, since the current discharged by the first C1 and fourth C4 capacitors flows also through the other two capacitors C2 and C3, the third phase winding W3 is also energized in the reverse direction, as at (D) in FIG. 3.

Figure 4:
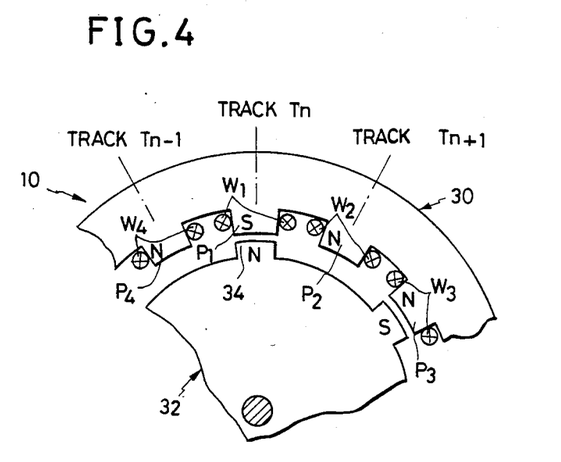
FIG. 4 is a fragmentary, diagrammatic section through the stepping motor of FIG. 1, with the rotor shown stopped in one of the predetermined positions with respect to the stator poles when the stepping motor is drivn by the drive system of FIG. 2 in the single phase drive mode of FIG. 3.

We have illustrated in FIG. 4 the resulting polarization of the four stator poles P1 through P4, and the resulting angular position of the rotor 32, of the stepping motor 10. As the first phase winding W1 remains excited forwardly from the second supply terminal 40 after the moment t5, as at (B) in FIG. 3, the associated first phase stator pole P1 of each set is polarized into S polarity, for example, to attract one of the N poles 34 of the rotor 32. The reverse excitation of the second W2 and fourth W4 phase windings results in the polarization of the second P2 and fourth P4 phase stator poles, disposed on both sides of the first phase stator pole P1 of S polarity, into N polarity. These neighboring stator poles P2 and P4 of N polarity act to repel the N rotor pole being attracted by the first phase stator pole P1 and so to urge the N rotor pole into more exact alignment therewith.

Further, in this particular embodiment, the third phase stator pole P3 of each set is also polarized into N polarity, to attract one of the S poles of the rotor 32. This third phase stator pole P3 also aids in holding the rotor 32 in the exact angular position.

The stepping motor drive system 36 of FIG. 2 is not limited to the single phase driving of the stepping motor 10 but also to the two phase driving thereof. We have thereofre shown in FIG. 5 the voltage waveforms appearing in the drive system 36 when the stepping motor 10 is driven in the two phase mode.

Figure 5:
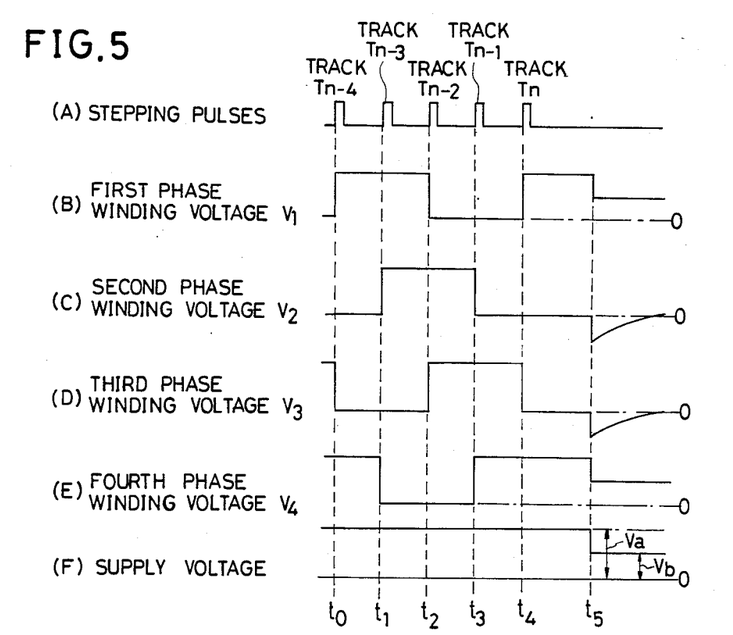
FIG. 5 is a series of waveform diagrams also useful in explaining the operation of the drive system of FIG. 2 in the two phase drive mode.

As in the single phase mode the phase control circuit 48 responds to the stepping pulses of FIG. 5(A) for exciting the four phase stator windings W1 through W4 in the two phase mode. As indicated at (B) through (E) in FIG. 5, the phase control circuit 48 causes sequential conduction through the four switching transistors Q1 through Q4, two at a time, with the consequent energization of the first W1 and fourth W4 phase windings from moment t0 to moment t1, of the first W1 and second W2 phase windings from moment t1 to moment t2, of the second W2 and third W3 phase windings from moment t2 to moment t3, and of the third W3 and fourth W4 phase windings from moment t3 to moment t4. The transducer head assembly 20, FIG. 1, of the disk drive 12 is thus transported radially of the magnetic disk 14 to the n'th track Tn through the successive tracks Tn-4, Tn-3, Tn-2 and Tn-1. The power switching transistor 42 has been conductive during all this period, as at (F) in FIG. 5, for the excitation of the windings W1 through W4 with the first supply voltage Va of 12 volts.

As the delivery of the series of steping pulses discontinues at the moment t4, both first W1 and fourth W4 phase windings are held excited thereafter in order to hold the head assembly 20 on the track Tn. Since the first Q1 and fourth Q4 switching transistors remain conductive after the moment t4, the first C1 and third C3 capacitors both become charged to 12 volts via the second W2 and third W3 phase windings, respectively.

When the power control circuit 50 terminates conduction through the power switching transistor 42 at the moment t5, as at (F) in FIG. 5, the second supply voltage Vb of five volts is impressed to the windings W1 through W4. The resulting potential differences across the second W2 and third W3 phase windings cause the first C1 and third C3 capacitors to discharge through these windings. Thus the second W2 and third W3 phase windings are reversely excited after the moment t5, as at (C) and (D) in FIG. 5, whereas the first W1 and fourth W4 phase windings are forwardly excited with the second supply voltage Vb, as at (B) and (E) in FIG. 5.

Figure 6:
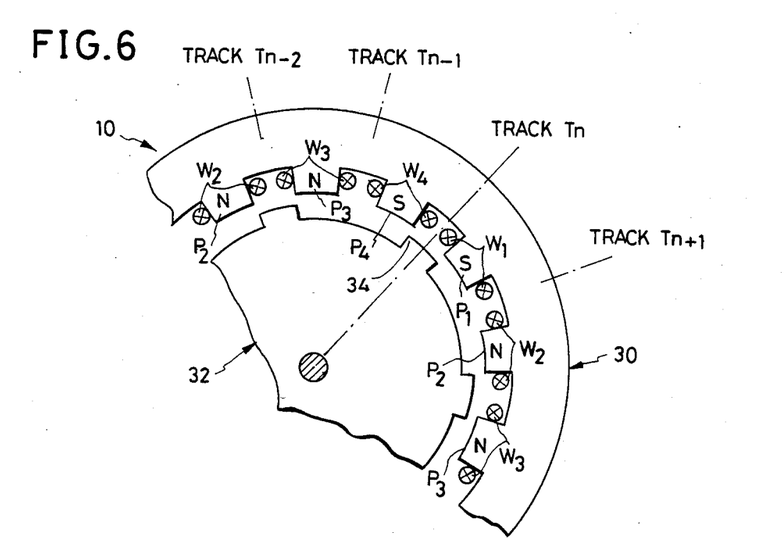
FIG. 6 is a fragmentary, diagrammatic section through the stepping motor of FIG. 1, with the rotor shown stopped in one of the predetermined positions when the motor is driven by the drive system of FIG. 2 in the two phase drive mode of FIG. 5.

FIG. 6 is an illustration of the resulting polarizations of the stator poles P1 through P4, and of the resulting angular position of the rotor 32, of the stepping motor 10. Each N pole of the rotor 32 is located at the midpoint between one of the first phase stator poles P1 and the neighboring one of the fourth phase stator poles P4, both first and fourth phase stator poles being polarized into S polarity by the forward excitation of the first W1 and fourth W4 phase windings. This rotor position corresponds to the track Tn. Further, in accordance with our invention, both second W2 and third W3 phase windings are reversely excited as above, with the consequent polarization of the second P2 and third P3 stator poles into N polarity. It will be observed from FIG. 6 that each neighboring pair of second P2 and third P3 stator poles of N polarity coact to force one of the S poles of the rotor 32 to the midpoint therebetween. Thus, not only the first P1 and fourth P4 stator poles but also the second P2 and third P3 stator poles act to force the rotor 32 to the required angular position.

Figure 7:
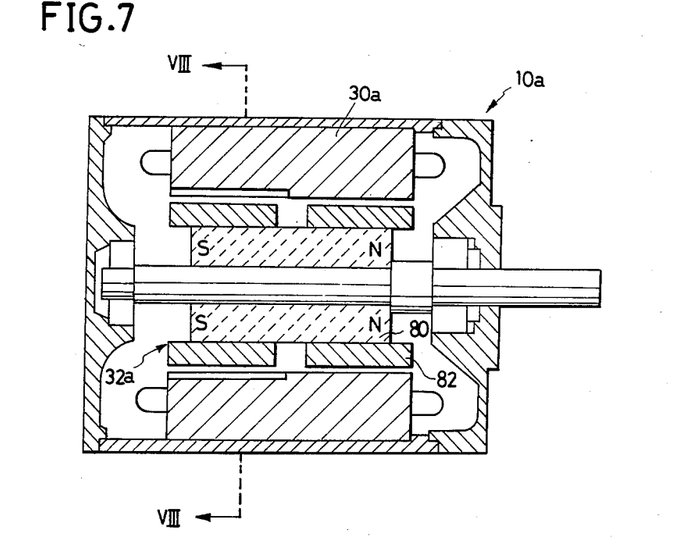
FIG. 7 is an axial section through an alternative form of stepping motor to be driven in accordance with our invention.
Figure 8:
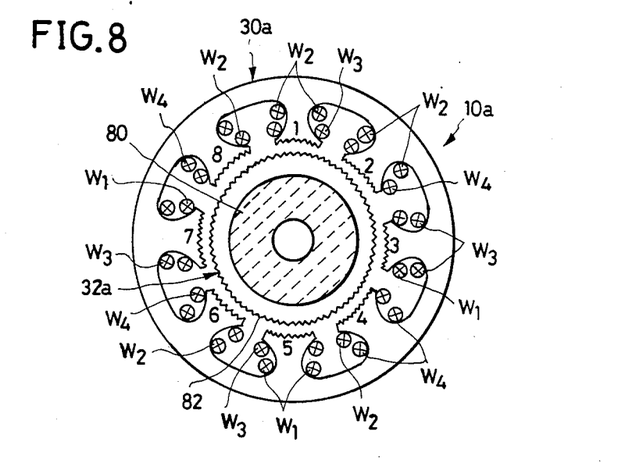
FIG. 8 is a section through the stepping motor of FIG. 17, taken along the line VIII—VIII therein.

Our invention finds application not only to the permanent magnet stepping motor 10 of FIG. 1 but also to a hybrid stepping motor 10a of FIGS. 7 and 8. The hybrid stepping motor 10a has a rotor 32a comprising a permanent magnet 80 and laminar steel cladding 82 thereon. The rotor 32a is toothed on its surface, and so are the poles of a stator 30a, to afford the rotation of the rotor by small increments. This alternate stepping motor is shown to have eight stator poles, designated 1 through 8 in FIG. 8, and each stator pole has two windings coiled in radially offset positions thereon. The radially outer windings are arranged in the order of the first phase W1, second phase W2, third phase W3, fourth phase W4, first phase W1, second phase W2, third phase W3 and fourth phase W4, and the radially inner windings are arranged in the order of the third phase W3, fourth phase W4, first phase W1, second phase W2, third phase W3, fourth phase W4, first phase W1 nd second phase W2, on the stator poles 1 through 8, respectively.

Although we have shown and described our invention in terms of preferable embodiments thereof, we recognize that these are by way of example only and not to impose limitations upon our invention. A variety of additional modifications or alterations will readily occur to the skilled artizans within the broad teaching hereof. The following is a brief list of such possible modifications or alterations of the illustrated embodiments.

1. The drive system 36 of FIG. 2 lends itself not only to the one or two phase drive, as has been disclosed herein, but also to the 1-2 phase drive of the stepping motor 10, to offer the same advantages as those set forth above in connection with the one and two phase drive modes.

2. The transducer head assembly 20 may be moved one track with every two or more stepping pulses, instead of with each stepping pulse as in the illustrated embodiments.

3. The reverse excitation of the stepping motor windings in accordance with our invention may be achieved by means other than the capacitors shown in FIG. 2. An obvious alternative is the connection of an additional power supply in parallel with each winding via a normally open switch. The required switches may be closed for the reverse excitation of the required windings from the respective additional power supplies when the motor is being stopped.

4. The transistors Q1 through Q4 may be replaced by other switching elements such as, tyically, NAND gates.

Additional modifications or alterations may be resorted to without departing from the scope of our invention.

We claim:

1. A method of driving a stepping motor having a plurality of windings of different phases on respective associated stator poles of annular arrangement, and a rotor having magnetic poles and rotatably disposed concentrically inwardly of the stator poles, which method comprises:
 (a) sequentially exciting the windings in a prescribed drive mode to cause an incremental rotation of the rotor toward a required angular position;
 (b) exciting, when the rotor is being stopped, at least one of the different phase windings which is determined by the prescribed drive mode in order to hold the rotor in the required angular position, with the result that the associated one of the stator poles is polarized into one polarity; and
 (c) also exciting, at least partly concurrently with step (b), those of the different phase windings which are disposed on both sides of said one winding, in a direction opposite to that in which said one winding is excited, with the result that the associated stator poles on both sides of said one stator pole are polarized into the opposite polarity, the stator pole of the one polarity and the neighboring stator poles of the opposite polarity conjointly acting on the rotor to positively hold the same in the required angular position.

2. The stepping motor drive method of claim 1 wherein the prescribed drive mode is a single phase drive mode.

3. The stepping motor drive method of claim 1 wherein the prescribed drive mode is a two phase drive mode.

4. A method of driving a stepping motor having first, second, third and fourth phase windings on respective stator poles of annular arrangement, and a rotor having magnetic poles and rotatably disposed concentrically inwardly of the stator poles, which method comprises:
   (a) sequentially exciting the four phase windings in a prescribed drive mode to cause the incremental rotation of the rotor toward a required angular position;
   (b) exciting, when the rotor is being stopped, at least one of the four phase windings which is determined by the prescribed drive mode in order to hold the rotor in the required angular position, with the result that the associated one of the stator poles is polarized into one polarity; and
   (c) also exciting, at least partly concurrently with step (b), those two of the four phase windings which are disposed immediately on both sides of said one winding, in a direction opposite to that in which said one winding is excited, with the result that the associated stator poles on both sides of said one stator pole are polarized into the opposite polarity, the stator pole of the one polarity and the neighboring stator poles of the opposite polarity conjointly acting on the rotor to positively hold the same in the required angular position.

5. The stepping motor drive method of claim 4 wherein all but said one of the four phase windings are excited in the opposite direction.

6. A drive system for a stepping motor of the type having a plurality of different phase windings on respective stator poles of annular arrangement, and a rotor having magnetic poles and rotatably disposed concentrically inwardly of the stator poles, the drive system comprising:
   (a) power supply means connected to the windings each at a first extremity thereof;
   (b) a switching element connected between a second extremity of each winding and ground;
   (c) a phase control circuit for making on/off control of the switching elements in response to stepping pulses for causing the excitation of the windings in a prescribed drive mode and hence for causing the rotor to rotate incrementally to a required angular position, the phase control circuit finally causing the excitation of at least one of the windings which is determined by the prescribed drive mode, in order to hold the rotor in the required angular position, with the result that the associated one of the stator poles is polarized into one polarity; and
   (d) reverse excitation means for exciting, at least partly concurrently with the final excitation of said one winding by the phase control circuit, those of the different phase windings which are disposed on both sides of said one winding, in a direction opposite to that in which said one winding is excited, with the result that the associated stator poles on both sides of said one stator pole are polarized into the opposite polarity, the stator pole of the one polarity and the neighboring stator poles of the opposite polarity conjointly acting on the rotor to positively hold the same in the required angular position.

7. The stepping motor drive system of claim 6 wherein the prescribed drive mode is a single phase drive mode.

8. The stepping motor drive system of claim 6 wherein the prescribed drive mode is a two phase drive mode.

9. A drive system for a stepping motor of the type having first, second, third and fourth phase windings on respective stator poles of annular arrangement, and a rotor having magnetic poles and rotatably disposed concentrically inwardly of the stator poles, the drive system comprising:
   (a) a first supply terminal for providing a first supply voltage;
   (b) a second supply terminal for providing a second supply voltage lower than the first supply voltage;
   (c) power switching means for selectively connecting the first and second supply terminals to first extremities of the first to fourth phase windings;
   (d) first to fourth switching elements connected respectively between second extremities of the first to fourth phase windings and ground;
   (e) first to fourth capacitors connected between the second extremities of the first and second, second and third, third and fourth, and fourth and first, phase windings respectively;
   (f) a phase control circuit for making on/off control of the first to fourth switching elements in response to stepping pulses for causing the excitation of the first to fourth phase windings in a prescribed drive mode and hence for causing the rotor to rotate by increments; and
   (g) a power control circuit connected to the power switching means for holding the first supply terminal connected to the first to fourth phase windings when a series of stepping pulses are being supplied to the phase control circuit at a predetermined recurrence rate, and for causing the power switching means to connect the second supply terminal to the first to fourth phase windings upon termination of each series of stepping pulses.

10. The stepping motor drive system of claim 9 wherein the power switching means comprises:
    (a) a transistor connected between the first supply terminal and the first extremities of the first to fourth phase windings; and
    (b) a diode connected between the second supply terminal and the first extremities of the first to fourth phase windings.

11. The stepping motor drive system of claim 9 wherein the power control circuit comprises a retriggerable monostable multivibrator which remains in an unstable state for a predetermined length of time longer than the predetermined time distance between the stepping pulses.

* * * * *